(12) United States Patent
Kim et al.

(10) Patent No.: US 7,434,957 B2
(45) Date of Patent: Oct. 14, 2008

(54) BACKLIGHT UNIT

(75) Inventors: Jae Bum Kim, Taegu-kwangyokshi (KR); Seok Hwan Oh, Gimcheon-shi (KR)

(73) Assignee: LG Display Co., Ltd., Seoul (KR)

( * ) Notice: Subject to any disclaimer, the term of this patent is extended or adjusted under 35 U.S.C. 154(b) by 87 days.

(21) Appl. No.: 10/959,265

(22) Filed: Oct. 6, 2004

(65) Prior Publication Data
US 2005/0141220 A1   Jun. 30, 2005

(30) Foreign Application Priority Data
Dec. 30, 2003   (KR)   .................. 10-2003-0099911

(51) Int. Cl.
*F21S 4/00*   (2006.01)
(52) U.S. Cl. ................ 362/225; 362/219; 362/260; 362/630; 362/634
(58) Field of Classification Search ............. 362/29–30, 362/97, 217, 219, 225, 249–250, 260, 367–368, 362/630, 634; 349/58, 60–61, 70
See application file for complete search history.

(56) References Cited

U.S. PATENT DOCUMENTS 6,905,224 B2 * 6/2005 Yoo et al. .................. 362/225
7,172,330 B2 * 2/2007 Lee et al. .................. 362/634
2003/0112626 A1 * 6/2003 Yoo et al. .................. 362/225

FOREIGN PATENT DOCUMENTS

| JP | S57-044533 | 8/1955 |
| JP | H08-082798 | 3/1996 |
| JP | 2000284283 A | * 10/2000 |
| JP | 2003-197154 | 7/2003 |

OTHER PUBLICATIONS

Office Action dated May 11, 2007 for corresponding Chinese Patent Application 2004100914625.
Office Action Corresponding to Japanese Patent Application Serial No. 2004-365428.

* cited by examiner

*Primary Examiner*—Sandra O'Shea
*Assistant Examiner*—Jason Moon Han
(74) *Attorney, Agent, or Firm*—Brinks Hofer Gilson & Lione (57) ABSTRACT

A backlight unit includes a plurality of lamps, a gripping device, and fasteners. The gripping device couples the ends of the plurality of lamps. The fasteners secure the lamps and gripping device to a frame of the backlight unit. A method of assembling a backlight display includes: aligning a cylindrical lamp with a flange of a gripping device; sliding the lamp past a flaring portion of a holding portion; and seating the lamp into the holding portion by pressing the lamp into a concave portion of the holding portion.

24 Claims, 8 Drawing Sheets

BACKLIGHT UNIT

PRIORITY CLAIM

This application claims the benefit of Korean Patent Application No. P2003-99911, filed in Korea on Dec. 30, 2003. The disclosure of the application is incorporated herein by reference.

BACKGROUND

1. Technical Field

This invention relates to backlighting, and more particularly, to a backlight display having solderless terminals.

2. Related Art

Some liquid crystal displays are lighter, smaller, and consume less power than conventional monitors. The liquid crystal displays include a liquid crystal display panel having liquid crystal cells positioned between two substrates. An illuminating unit may be positioned behind the liquid crystal display panel to supplement light received from external sources. An edge type or direct type illuminating display may improve clarity and brighten the display panel.

In some edge type displays, a lamp, a light guide, and a reflecting plate transmit light to the liquid crystal display panel with minimal attenuation or loss. The light guide receives light from the reflecting plate and the lamp positioned near the peripheral edge of the liquid crystal display panel. In a direct type display, multiple lamps are positioned between the peripheral sides of the liquid crystal display panel below a light spreading means. Direct type displays can be very efficient and produce a high brightness. These displays may be used in large liquid crystal displays.

While direct type displays can be more efficient than other conventional displays, the direct type displays can be susceptible to lamp failure. When one or more lamps fail in a direct type display, a portion of the liquid crystal display panel may not illuminate leaving that portion darker than the rest of the display panel. In a similar edge type display, a lamp failure may be less noticeable as the light guide can compensate for the uneven brightness.

Since a lamp failure can be more noticeable in direct type displays, the burned out lamps often require replacement. In a direct type liquid crystal display (LCD), a mounting and disconnecting structure is often used. The mounting and disconnecting structure may include a fusible tin and lead alloy such as solder that joins metallic parts together.

Figure 1:
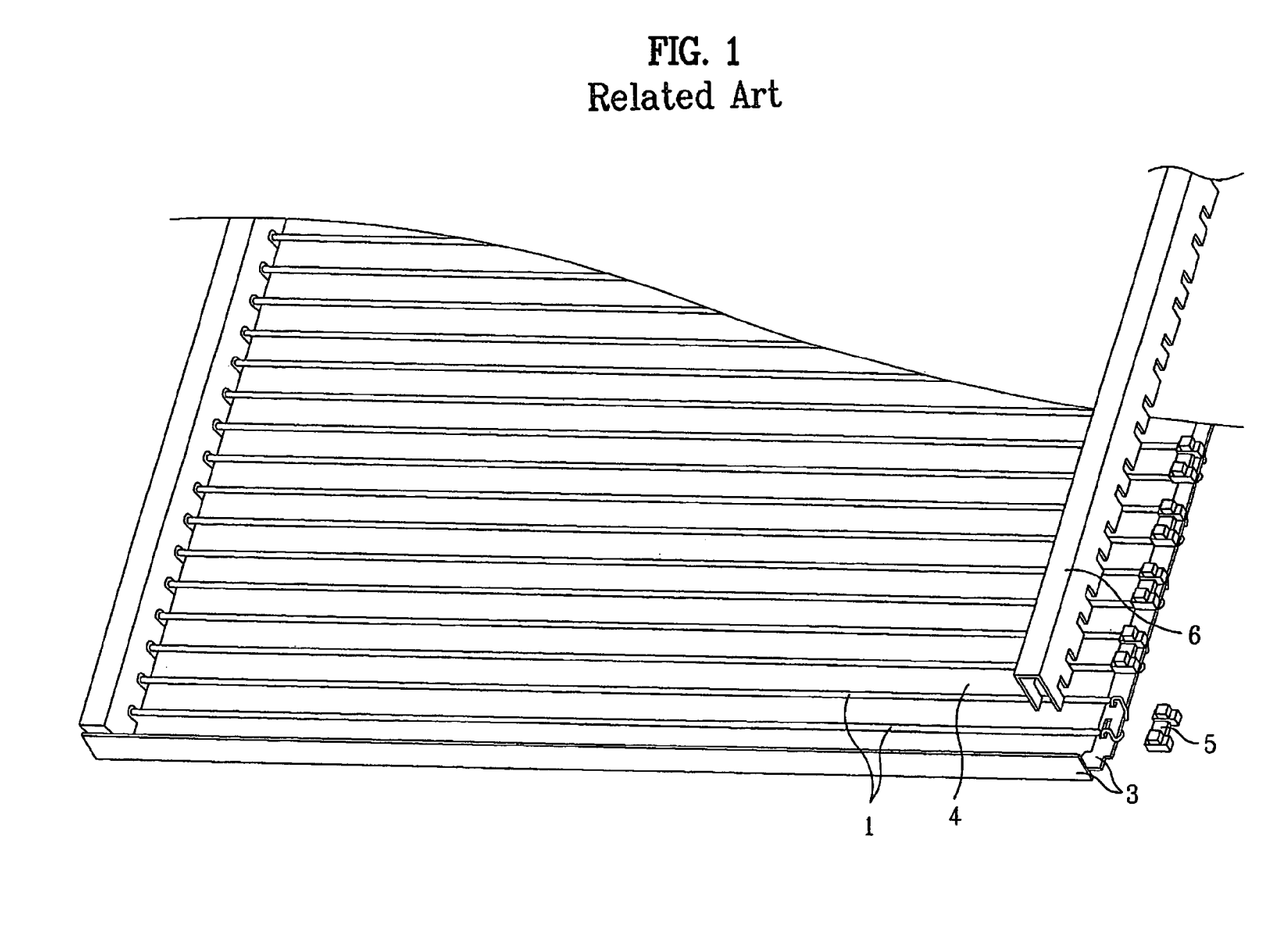
FIG. 1 illustrates a perspective view of a backlight unit.
Figure 2:
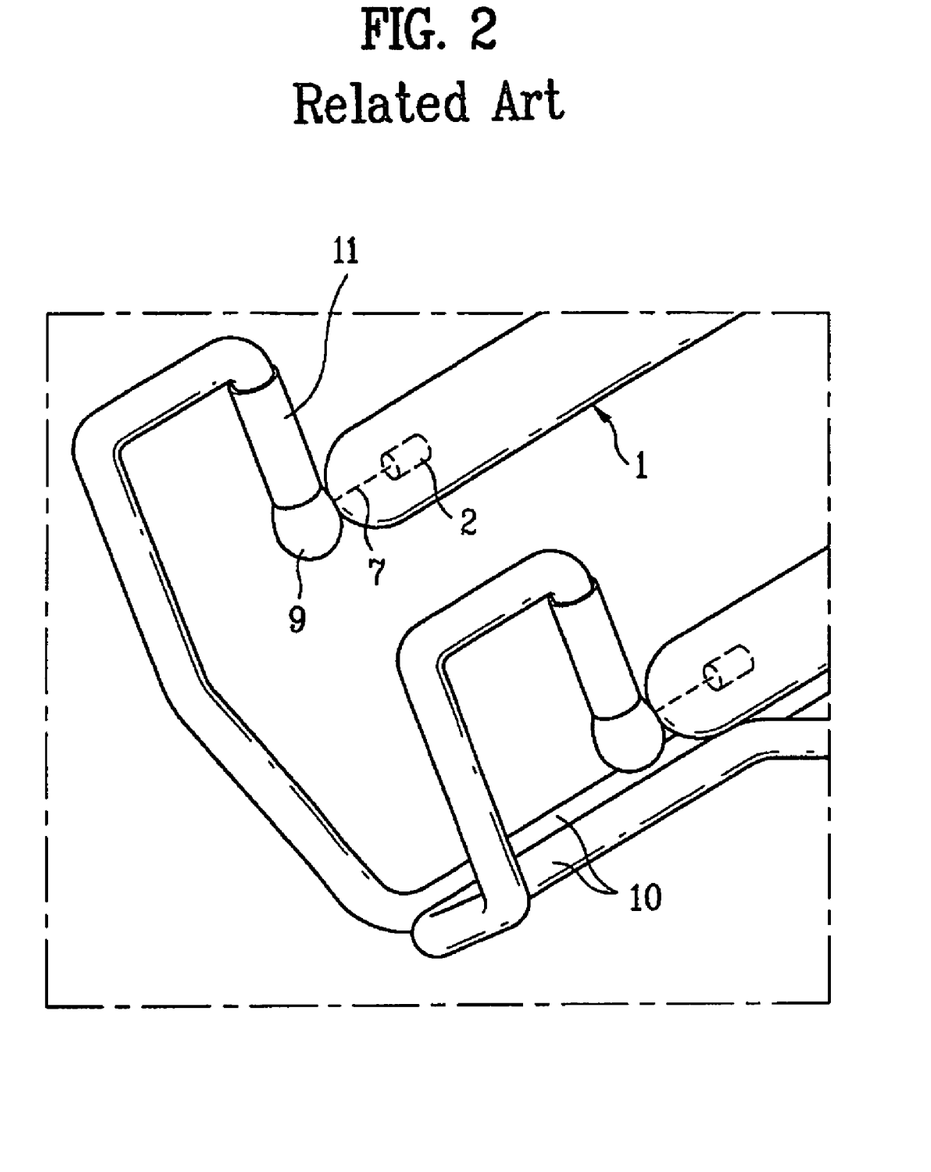
FIG. 2 illustrates a perspective view of a portion of a lamp of FIG. 1.

FIGS. 1 and 2 illustrate a direct type display that includes a plurality of lamps 1 having electrodes 2 positioned at opposite ends of the lamp tubes. A lower frame 3 underlies a bottom portion of the lamps 1 terminating at an upper frame 6 that receives the lamp tube ends. A reflective plate 4 directs light from the lower frame 3 that couples a plurality of lamp holders 5. In the direct type display of FIG. 2, lamps 1 electrically couple a power source through a plurality of electrodes 2 positioned at opposite ends of the lamps 1. The inner lead lines 7 electrically couple a contraction tube through a fusible tin and lead alloy such as solder. The outer lead lines are held/connected to inverters (not shown) by wires 10 positioned near an underside of the lower frame 3.

The soldering process joins the inner lead line 7 and the outer lead line 10. The expansion and contraction of the direct type display or the external force (particularly, a bending force) needed to insert the tubes may cause an immediate or latent failure of the solder joints. The forces and vibrations induced through the transportation and handling of the direct type displays may also induce stress, which must be absorbed by the components and the solder joints causing internal damage.

Figure 3:
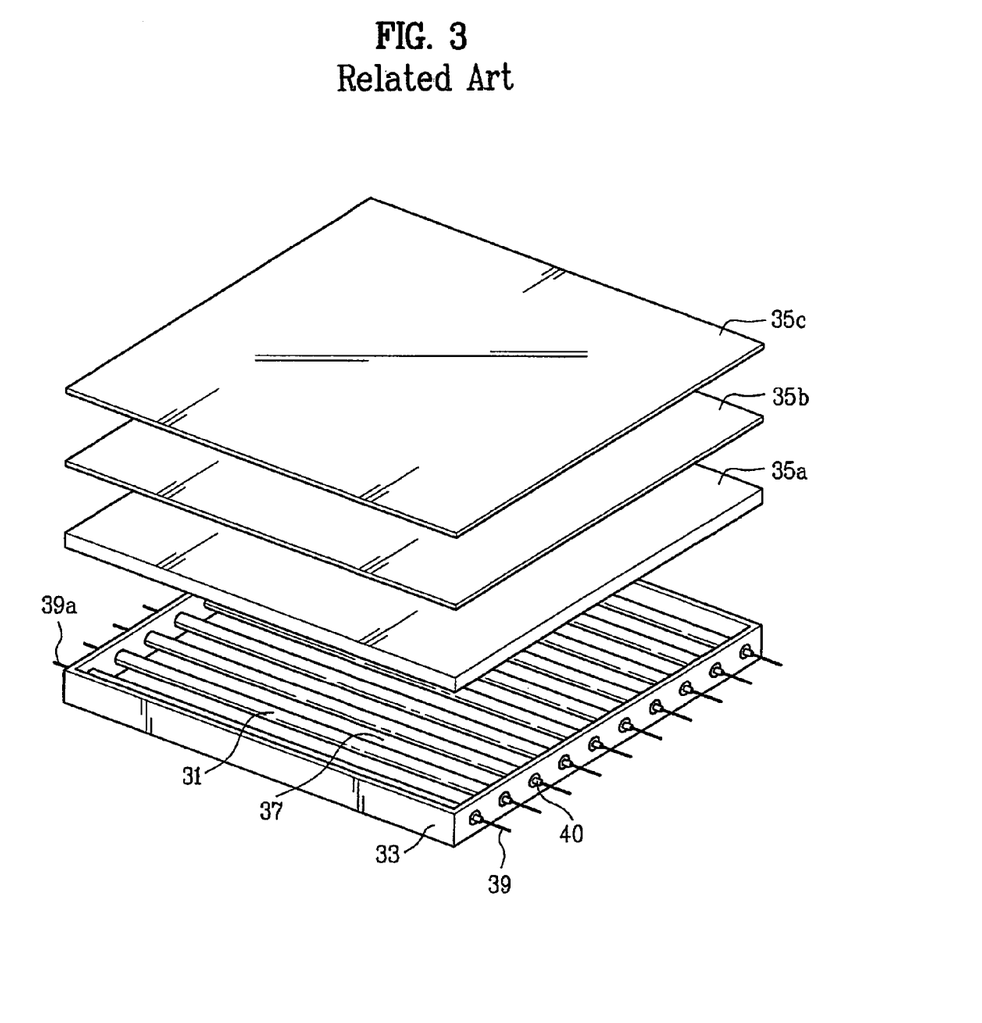
FIG. 3 illustrates a perspective view of a second backlight unit.
Figure 4:
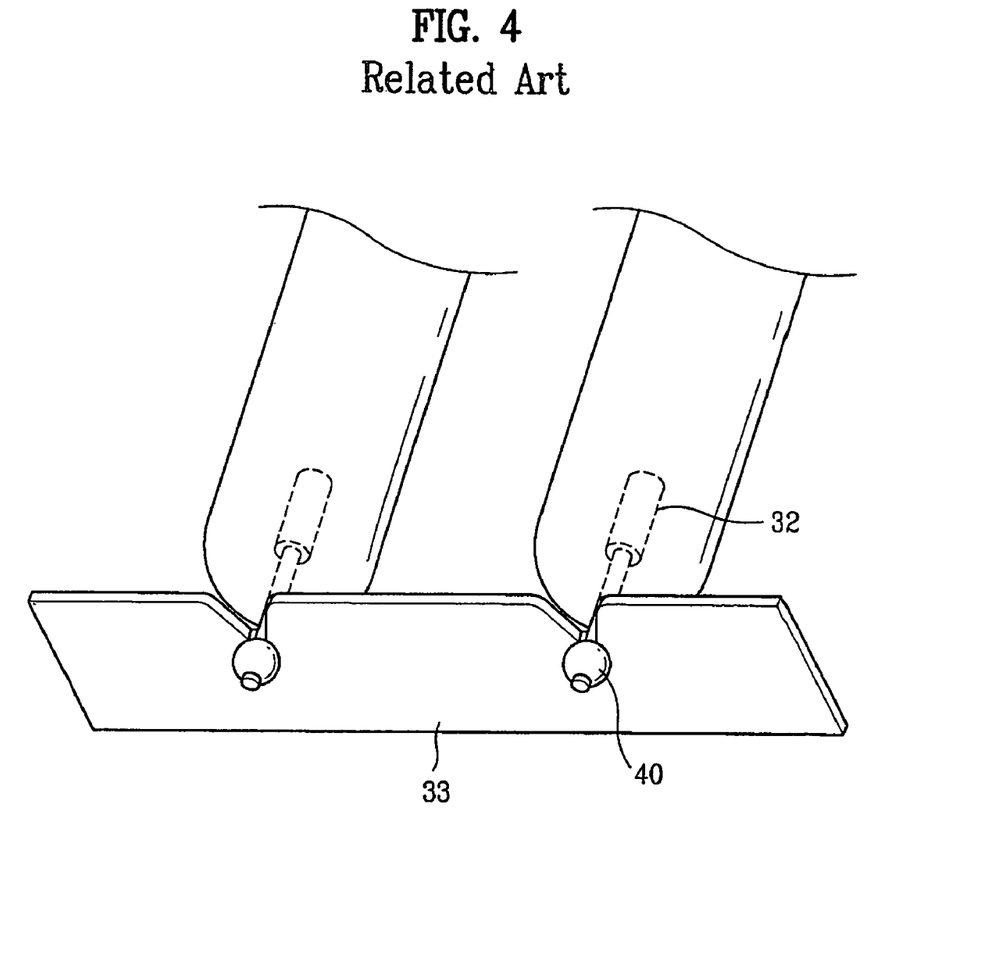
FIG. 4 illustrates a perspective view of a portion of a lamp of FIG. 3.

FIGS. 3 and 4 illustrates another backlight unit having a plurality of lamps 31 and an outer case 33 placed under light spreading means 35a, 35b, and 35c. The light spreading means 35a, 35b, and 35c includes a plurality of diffusion sheets and diffusion plates positioned above the lamps. A reflective plate 37 is positioned below the lamps to direct light toward the display. Like FIG. 2, the lamps are lamp tubes having electrodes 32 positioned at opposite ends of the lamp tubes. Lead lines 39 and 39a are connected to the electrodes 32 to provide power to the backlight assembly. Each of the lead lines 39 and 39a of a particular lamp tube are connected to a driving circuit through a separate connector. The lead lines 39 and 39a are electrically connected to the electrodes 32 and a voltage source through a solder joint. Other solder joints 40 connect one of the lead lines 39 or 39a to the outer case.

Like many solder joints, the stress caused by movement and the difficulty in forming a solder joint can result in latent, and a catastrophic joint failure. The embodiments overcome some of these potential drawbacks in the related art.

SUMMARY

A backlight unit includes a plurality of lamps, a gripping device, and removable fasteners. The gripping device couples the ends of the plurality of lamps. The removable fasteners secure the lamps and gripping device to a frame of the backlight unit.

A method of assembling a backlight display includes: aligning a cylindrical lamp with a flange of a removable gripper; sliding the lamp past a flaring portion of a holding portion; and seating the lamp into the holding portion by pressing the lamp into a concave portion of the holding portion.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The inventions can be better understood with reference to the following drawings and description. The components in the figures are not necessarily to scale, emphasis instead being placed upon illustrating the principles of the inventions. Moreover, in the figures, like referenced numerals designate corresponding parts throughout the different views.

DETAILED DESCRIPTION OF THE EMBODIMENTS

A removable fastening device may improve the assembly and operation of a backlight display. The fastening device may comprise a device that mechanically grips and electrically couples a lamp. The fastening device may include one or more friction locking devices partially configured to an outer portion of the lamp. The friction locking devices may expand and contract with the lamp as the lamp heats up or cools down. The fastening device may improve a display's durability by providing the lamp with movable electrical connections to multiple portions of the lamp's electrodes.

Figure 5:
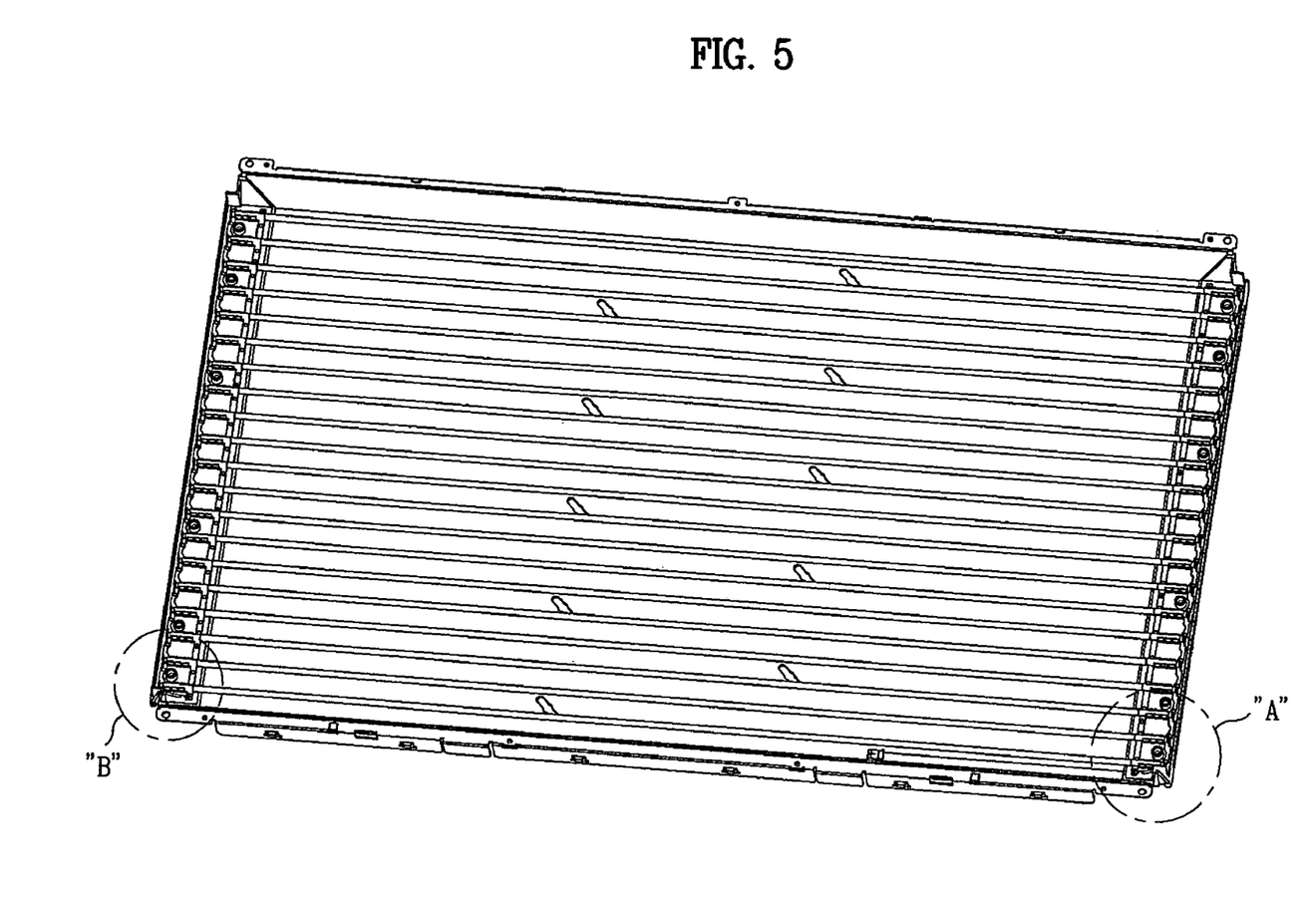
FIG. 5 illustrates a perspective view of a direct type backlight unit.
Figure 6A:
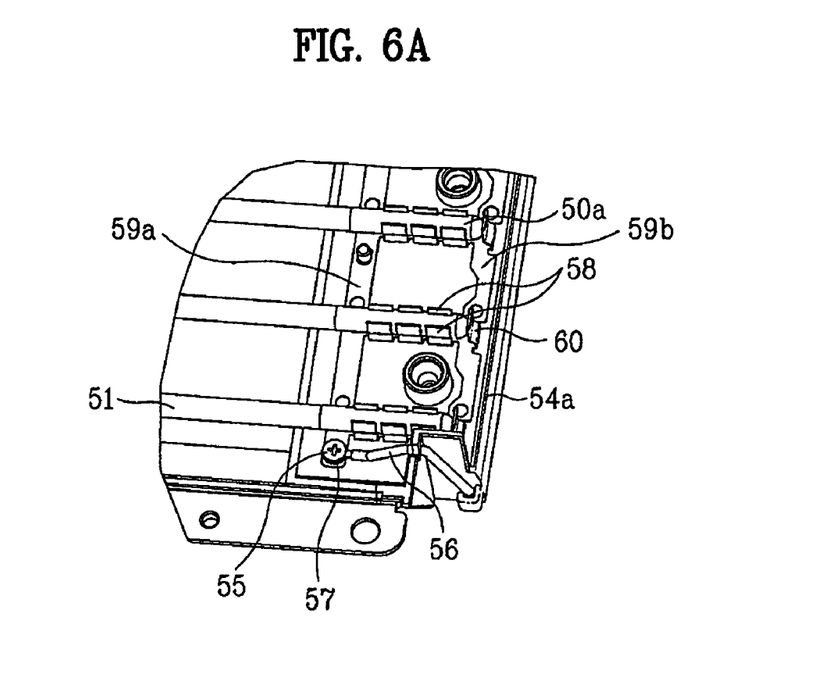
FIG. 6A illustrate an enlarged perspective view of a portion of FIG. 5.
Figure 6B:
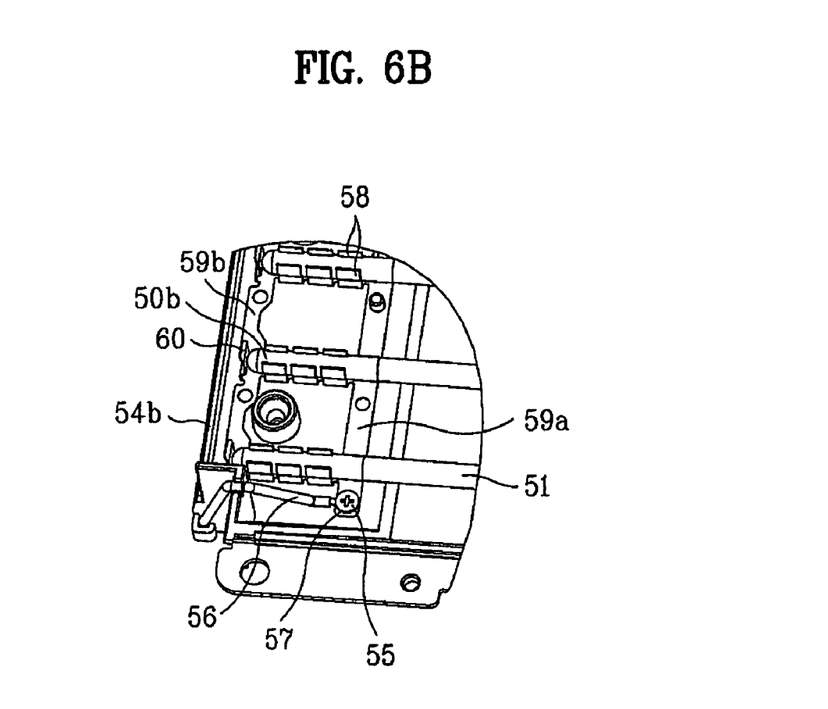
FIG. 6B illustrates an enlarged perspective view of a second portion of FIG. 5.

FIG. 5 is a top perspective view of a backlight unit. The backlight unit includes a plurality of lamps 51 shown in FIGS. 6A and 6B disposed at regular intervals above a reflective sheet. Each of the lamps 51 has electrodes 50a and 50b extending from opposite ends of the lamp tubes. A gripper type common electrode 53 shown in FIG. 7 conveys power to the electrodes 50a and 50b while holding the lamps 51 in place. First and second lower frames 54a and 54b mechanically couple the common electrodes 53 through fasteners 55. A conductor 56 electrically couples an inverter (not shown) to the common electrode 53. The conductor 56 supplies a voltage to the common electrode 53.

Figure 7:
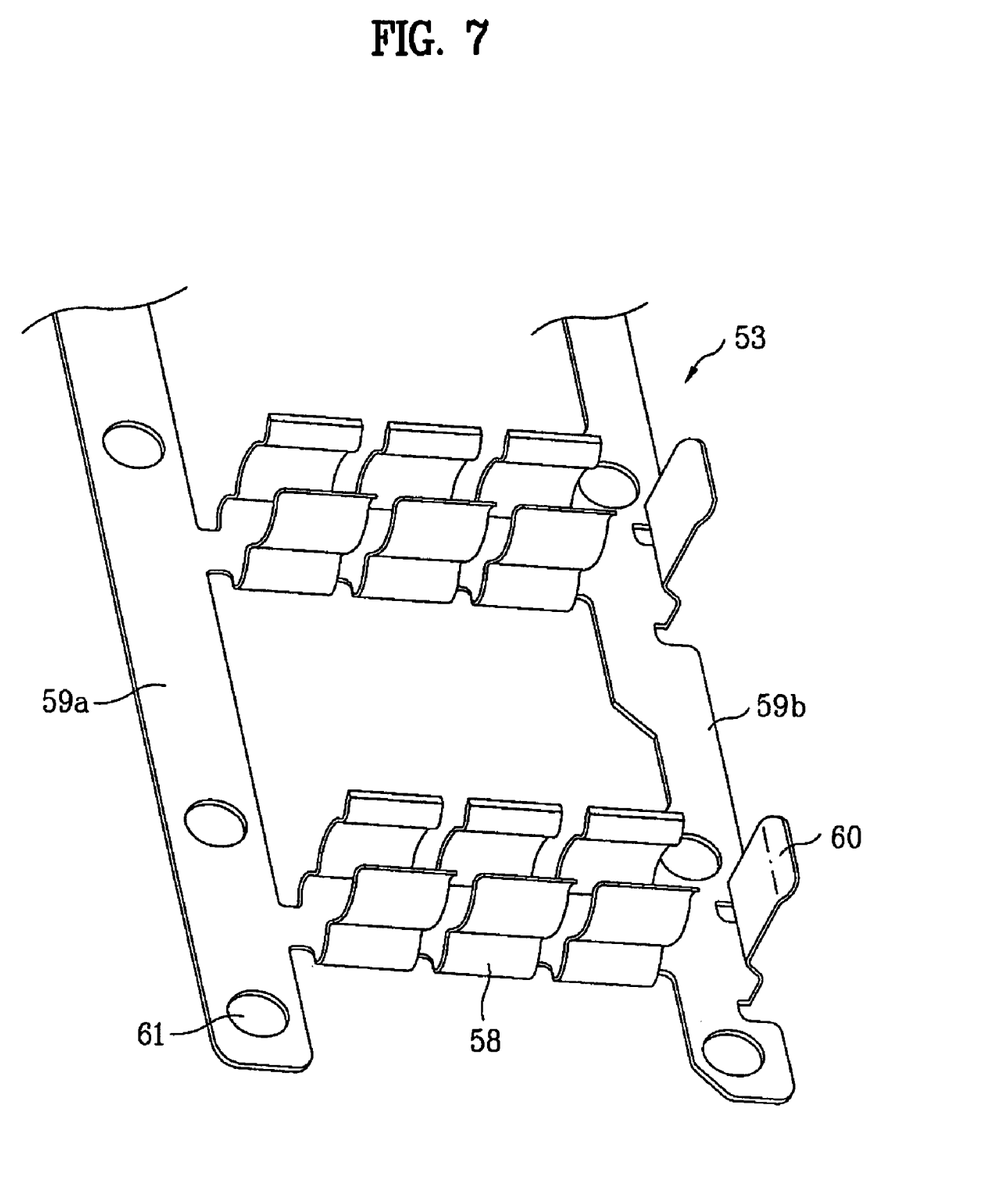
FIG. 7 illustrates a perspective view of a common electrode.

Referring to FIG. 7, the common electrode 53 includes a plurality of spaced apart holding portions 58. The arc shaped flexible members that may comprise the holding portions 58 electrically couple the electrodes 50a and 50b at opposite ends of the lamp 51 while providing separation from the lower frames 54a and 54b shown in FIGS. 6A and 6B. Lateral stopper 60 disposed near an edge of each of the second common electrode lines 59b, respectively, secures the ends of the lamps 51 to the gripper type common electrode 53, and minimizes lateral movement of the lamps 51. As shown, a lower portion of the lateral stopper 60 projects toward the holding portions 58 while a top portion flares away from the holding portions 58.

In FIG. 7, the arc shaped flexible members may be separated by one, two (which is shown), or more slots. The multiple concave portions and flaring portion of the arc shaped flexible members may be configured to maximize contact with the lamp 51 and improve electrical continuity/conductivity. The gripper type holding portion 58 enables the fastening device to hold the lamp 51 and the common electrode 53 together without a fusible tin and lead alloy such as solder.

The electrical connection between the first common electrode 59a and a surrounding electrode 57 also may be joined without solder. The surrounding electrode 57 may have a circular shape or assume many other shapes. In FIG. 7, a fastener such as a rod incised with helical threads or a screw 55 connects the first common electrode 59a to the surrounding electrode 57 through a biasing force or a turning motion, for example. The conductor 56, which is shown as a wire, may be coupled to the first common electrode 59a by the fastener.

A diffuser may be disposed above the lamps 51. The diffuser, which may comprise, for example, a light-diffusing material coated onto one or more sides of a film may also comprise one or more diffusion sheets. The film or diffusion sheets may collect and spread the light that is directed to a liquid crystal display panel. A plurality of optical sheets may be disposed between the diffuser and a liquid crystal display panel to collect light exiting the diffuser and adjust the direction of the light such that light exits from the optical sheet in a substantially perpendicular direction to a surface of the liquid crystal display panel. The optical sheets may improve the efficiency of the light impinging on the liquid crystal display panel.

The embodiments are not limited to a particular type of light or a type of mechanical gripping device as described above. Any type of lighting designs may be used including a direct-type and edge-type design. Furthermore, some gripper type common electrodes or gripper type electrodes may use more or less arc shaped flexible members to grip and hold the lamps 51. The arc shape design may also be configured to other lamp shapes and sizes just as the separation between the lower frames 54a and 54b and the lamps can be adjusted by the holding portion 58 of the gripper type common electrode or gripper type electrodes.

The single piece construction of the gripper type common electrode embodiment reduces assembly parts and may increase assembly efficiency of some liquid crystal displays. With the gripper type common electrode coupled to a supporting base, one or more lamps may be inserted between the lateral stoppers 60 that are adjacent to the edges of the lower frames 54a and 54b, respectively. A biasing force may slide the lamps 51 past the flaring part of the holding portion 58 until a circular contact is made with the outer electrodes 50b of the lamps 51. A tactile feedback perceptible to a sense of touch may indicate the seating of the lamps 51.

When fully seated, the holding portions 58 of the gripper type common electrode 53 mechanically couples different portions of the electrode 50b. The holding portions 58 may act like a friction fit that resists some relative motions caused by external force while allowing for lamp 51 and/or board expansion and contraction that may occur during assembly and use. Also, the holding portions 58 may improve the operation of the lamp by increasing the conducting path to the electrode 50b and act as a device that absorbs and dissipates heat (e.g., a heat sink).

Figure 8:
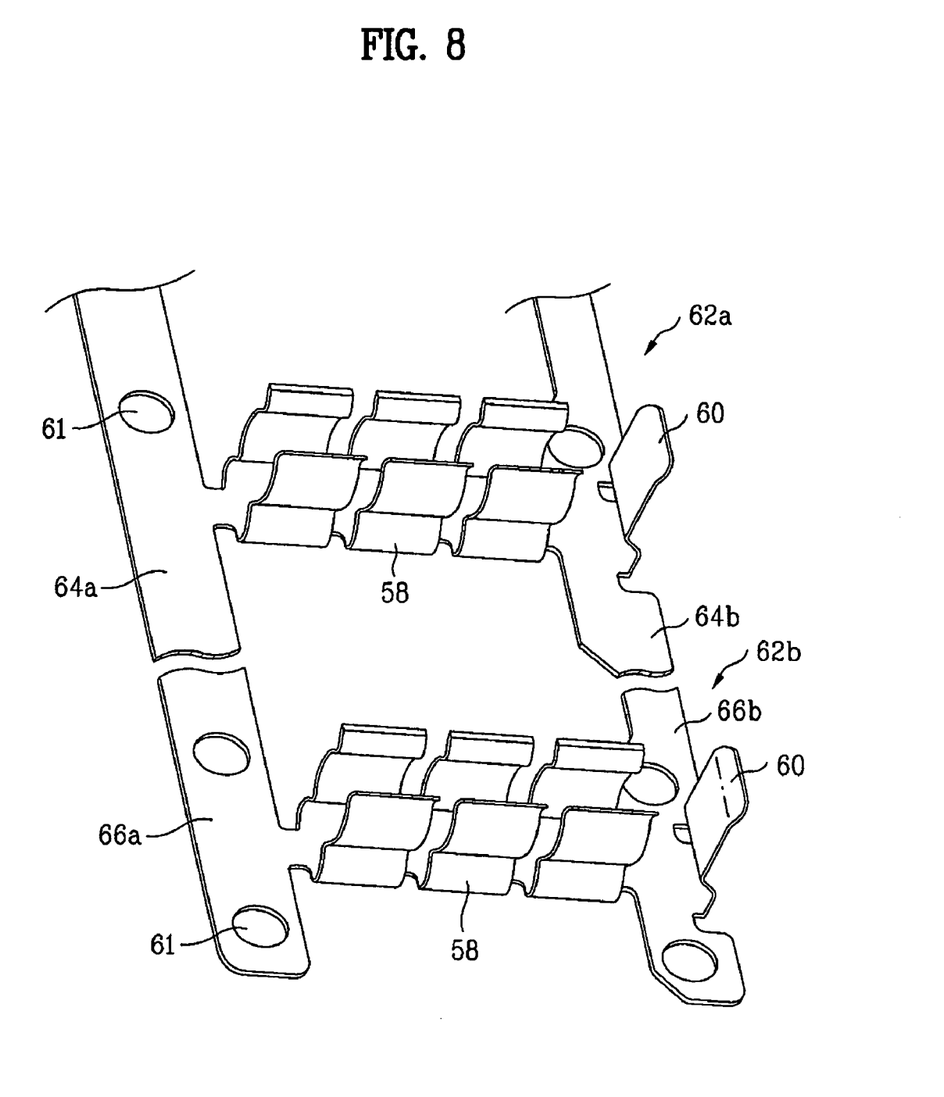
FIG. 8 illustrates a perspective view of a plurality of electrodes.

Another alternative embodiment is shown FIG. 8. In FIG. 8, a plurality of electrodes 62a and 62b include a plurality of spaced apart holding portions 58. The arc shaped flexible members that may comprise the holding portions 58 electrically couple separate electrodes at opposite ends of the lamp 51 while providing separation from the lower frames 54a and 54b shown in FIGS. 6A and 6B. Lateral stopper 60 disposed near an edge of each of the electrode lines 64b and 66b, respectively, secure the ends of the lamps 51 to the gripper type electrodes 62a and 62b and minimizes lateral movement of the lamps 51. As shown, a lower portion of the lateral stopper 60 projects toward the holdings portions 58 while a top portion flares away from the holding portions 58.

In FIG. 8, the arc shaped flexible members may be separated by one, two (which is shown), or more slots. The multiple concave portions and flaring portion of the arc shaped flexible members may be configured to maximize contact with the lamp 51 and improve electrical continuity/conductivity. The gripper type holding portion 58 enables the fastening device to hold the lamp 51 and the electrodes 62a and 62b together without a fusible metal alloy such as solder.

The electrical connection between the electrodes 64b and 66b and a surrounding electrode also may be joined without solder. The surrounding electrode may have a circular shape or assume many other shapes. In FIG. 8, a plurality of fasteners, such as rod incised with helical threads or screws for example, connects the first electrodes 64a and 66a, respectively, to the surrounding electrode through a biasing force or a turning motion, for example. The conductors, which may comprise wires for example, may be coupled to the first electrodes 64a and 66a, respectively, by the fastener.

A diffuser may be disposed above the lamps 51 that are coupled to the plurality of electrodes 62a and 62b. The diffuser, which may comprise, for example, a light-diffusing material coated onto one or more sides of a film may also comprise one or more diffusion sheets. The film or diffusion sheets may collect and spread the light that is directed to a liquid crystal display panel. A plurality of optical sheets may be disposed between the diffuser and a liquid crystal display panel to collect light exiting the diffuser and adjust the direction of the light such that light exits from the optical sheet in a substantially perpendicular direction to a surface of the liquid crystal display panel. The optical sheets may improve the efficiency of the light impinging on the liquid crystal display panel.

In the embodiments described above, the gripper type holding portion 58 of the plurality of electrodes 62a and 62b or the common electrode 53 may mechanically and electrically couple a voltage source without soldering. The simple alignment and insertion of the lamp 51 may simplify the assembly process and lower assembly time by joining electrical parts through a removable assembly. The environmentally friendly process may minimize or alternatively substantially eliminate the contamination caused by the joining metal parts with a tin and lead fusible alloy such as solder.

While various embodiments of the invention have been described above, it will be apparent to those of ordinary skill in the art that many more embodiments and implementations are possible and within the scope of the invention. Accordingly, the invention is not to be restricted except in light of the claims and their equivalents.

What is claimed is:

1. A backlight unit comprising:
   a plurality of lamps having opposite ends and having a first electrode and a second electrode disposed along an outer surface of a tube, respectively;
   a gripper type common electrode for holding the first and second electrodes of the lamps, the gripper type common electrode having a plurality of holding portions spaced apart from each other, for holding the first and second electrodes at the end of the lamps, first common electrode lines at inner sides of the first and second electrodes and second common electrode lines at outer sides of the first and second electrodes; whereby the first common electrode lines and the second common electrode lines are for coupling the holding portion;
   a stopper disposed at an edge of the second common electrode line, wherein the stopper is a substantially vertical member to the second common electrode line;
   a first frame and a second frame disposed near the opposite ends of the lamps for coupling the gripper type common electrode; and
   fasteners for coupling the lamps and the gripper type common electrode to the first frame and the second frame through a biasing motion.

2. The backlight unit of claim 1, wherein the biasing motion comprises a turning motion.

3. The backlight unit of claim 1, wherein the fasteners comprise solder free fasteners.

4. The backlight unit of claim 1, wherein the plurality of holding portions surround a peripheral surface of the lamp.

5. The backlight unit of claim 1, wherein the plurality of holding portions are separated by a plurality of slots passing through a width of the holding portion.

6. The backlight unit of claim 1, wherein the second common electrode line is disposed apart from the first common electrode line.

7. The backlight unit of claim 1, further comprising light spreading means for spreading light received from the lamps.

8. The backlight unit of claim 7, wherein the light spreading means comprises diffusion sheets.

9. The backlight unit of claim 7, wherein the light spreading means comprises diffusion plates.

10. The backlight unit of claim 1, wherein the fasteners comprise removable screws.

11. The backlight unit of claim 1, further comprising:
    a conductor through which the common electrode is supplied with a voltage; and
    a surrounding electrode that surrounds the fastener for connecting the gripper type common electrode to the conductor.

12. The backlight unit of claim 11, wherein the surrounding electrode comprises a circular shape.

13. A backlight unit comprising:
    a plurality of lamps having a first electrode and a second electrode at opposite ends, respectively;
    a gripping device that holds portions of the first and second electrodes of the lamps, the gripping device having a plurality of arc shaped flexible members, first common electrode lines at inner sides of the first and second electrodes and second common electrode lines at outer sides of the first and second electrodes; whereby the first common electrode lines and the second common electrode lines are for coupling the plurality of arc shaped flexible member; and a plurality of stoppers disposed at an edge of at the second common electrode line and configured to minimize lateral movement of the lamps, respectively, wherein the plurality of stoppers are substantially vertical members to the second common electrode lines; and
    a plurality of fasteners that secure the lamps and the gripping device to a frame of the backlight unit, the fasteners being configured to connect to the gripping device through a biasing force.

14. The backlight unit of claim 13, wherein the plurality of fasteners comprise a plurality of solder free fasteners.

15. The backlight unit of claim 13, herein the arc shaped flexible member comprises a friction locking device configured to the shape of the plurality of lamps.

16. The backlight unit of claim 15, wherein the plurality of fasteners comprises a plurality of rods incised with helical threads.

17. The backlight unit of claim 15, wherein the plurality of fasteners comprises a plurality of pins incised with threads.

18. The backlight unit of claim 13, wherein the arc shaped flexible members are separated by two or more slots.

19. The backlight unit of claim 18, wherein the plurality of arc shaped flexible members comprises a plurality of concave portions coupled to a flaring portion.

20. The backlight unit of claim 19, wherein one of the arc shaped flexible members is configured to support one of the lamps at a predetermined distance from the frame.

21. The backlight unit of claim 13, wherein the gripping device is configured to support the plurality of lamps at a predetermined distance from the frame.

22. The backlight unit of claim 13, wherein the gripping device comprises a plurality of stoppers configured to minimize movement of the lamps, respectively.

23. The backlight unit of claim 22, wherein the lamps are disposed in a direct type display.

24. A method of assembling a backlight display, comprising;
aligning a cylindrical lamp having a first electrode and a second electrode at opposite ends, respectively, with a flange of a removable gripper, the removal gripper having a plurality of holding portions spaced apart from each other, for holding the electrodes at the first and second electrodes of the lamps, and first common electrode lines at inner sides of the first and second electrodes and second common electrode lines at outer side of the first and second electrodes of the plurality of holding portions for coupling the holding portions, and a stopper disposed at an edge of the second common electrode line, wherein the stopper is a substantially vertical member to the second electrode line;
sliding the lamp past a flaring portion of a holding portion; and
seating the lamp into the holding portion by pressing the lamp into a concave portion of the holding portion.

* * * * *

UNITED STATES PATENT AND TRADEMARK OFFICE
CERTIFICATE OF CORRECTION

PATENT NO.        : 7,434,957 B2                                Page 1 of 1
APPLICATION NO. : 10/959265
DATED             : October 14, 2008
INVENTOR(S)       : Jae Bum Kim et al.

It is certified that error appears in the above-identified patent and that said Letters Patent is hereby corrected as shown below:

In column 6, claim 15, line 43, after "of claim 13," delete "herein" and substitute --wherein-- in its place.

In column 7, claim 24, lines 1-2, immediately after "comprising" delete ";" and substitute --:-- in its place.

Signed and Sealed this

Twenty-first Day of April, 2009

JOHN DOLL
*Acting Director of the United States Patent and Trademark Office*